United States Patent [19]
Iwata

[11] 3,934,270
[45] Jan. 20, 1976

[54] TWO-MOTOR CASSETT TYPE TAPE RECORDER

[75] Inventor: Mitsuo Iwata, Yokohama, Japan

[73] Assignee: Victor Company of Japan, Limited, Japan

[22] Filed: Nov. 8, 1973

[21] Appl. No.: 413,942

[30] Foreign Application Priority Data
Nov. 10, 1972 Japan............................ 47-112767
May 8, 1973 Japan............................ 48-50275
May 10, 1973 Japan............................ 48-51926
May 10, 1973 Japan............................ 48-51927
May 14, 1973 Japan............................ 48-53376

[52] U.S. Cl............. 360/96; 242/198; 360/71; 242/200
[51] Int. Cl............. G11b 15/32; G11b 23/04; G11b 19/26
[58] Field of Search............ 360/96, 90, 93, 71, 74, 360/60; 242/198, 199, 200–204

[56] References Cited
UNITED STATES PATENTS

| | | | |
|---|---|---|---|
| 2,756,279 | 7/1956 | Lang | 360/90 |
| 3,586,336 | 6/1971 | Rosenblatt | 360/60 |
| 3,635,423 | 1/1972 | Lennie | 360/96 |
| 3,692,257 | 9/1972 | Righi | 360/96 |
| 3,766,327 | 10/1973 | Johnson | 360/96 |
| 3,767,137 | 10/1973 | Richt | 360/96 |
| 3,788,571 | 1/1974 | Finster et al. | 360/95 |
| 3,800,322 | 3/1974 | Schoettle | 360/96 |

*Primary Examiner*—Alfred H. Eddleman
*Attorney, Agent, or Firm*—Robert E. Burns; Emmanuel J. Lobato; Bruce L. Adams

[57] ABSTRACT

A capstan is driven by a first motor at a constant tape play speed. A second motor is provided for selectively driving a supply wheel assembly and a take-up and fast-forward wheel assembly. The selective drive of the two assemblies is effected by a single idler which is driven by engagement with the second motor. The take-up and fast-forward wheel assembly comprises a take-up clutch wheel and fast-forward clutch wheel on a single shaft. The selective drive of these two wheels is effected by varying the height of the idler with respect to the chassis to correspond each of the wheels by means of a cam provided on a platform on which magnetic heads and pinch roller are mounted.

7 Claims, 10 Drawing Figures

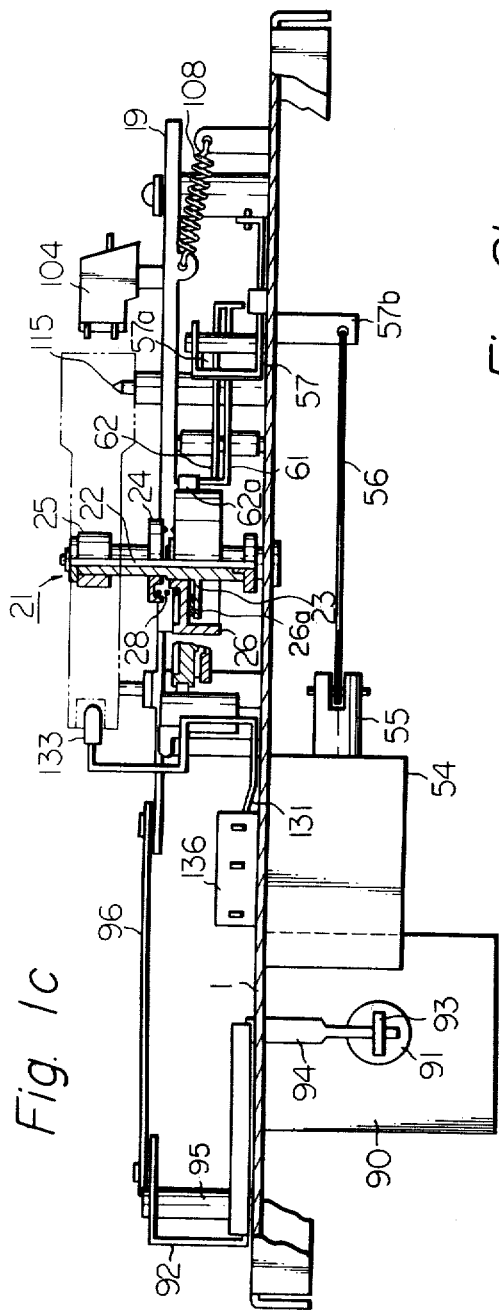
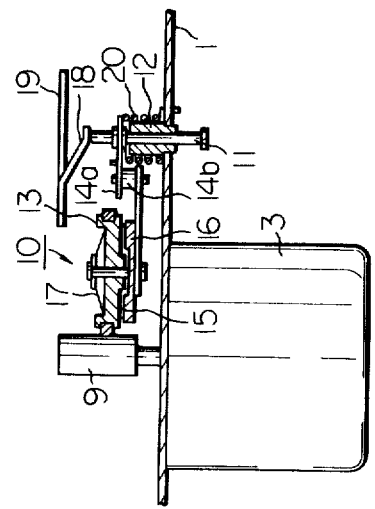
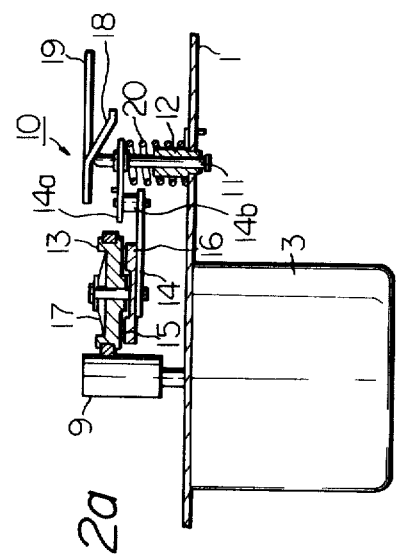
Fig. 1c
Fig. 2b
Fig. 2a

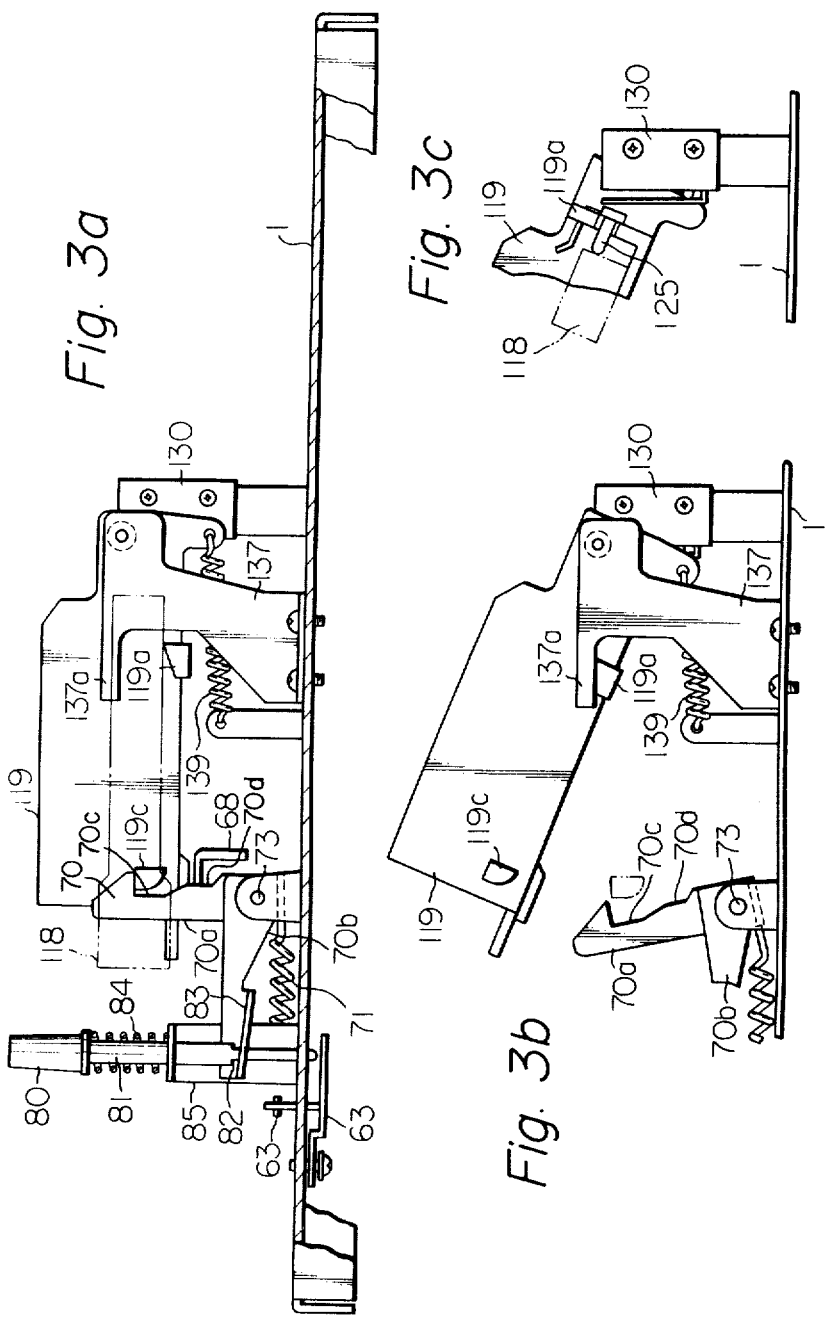

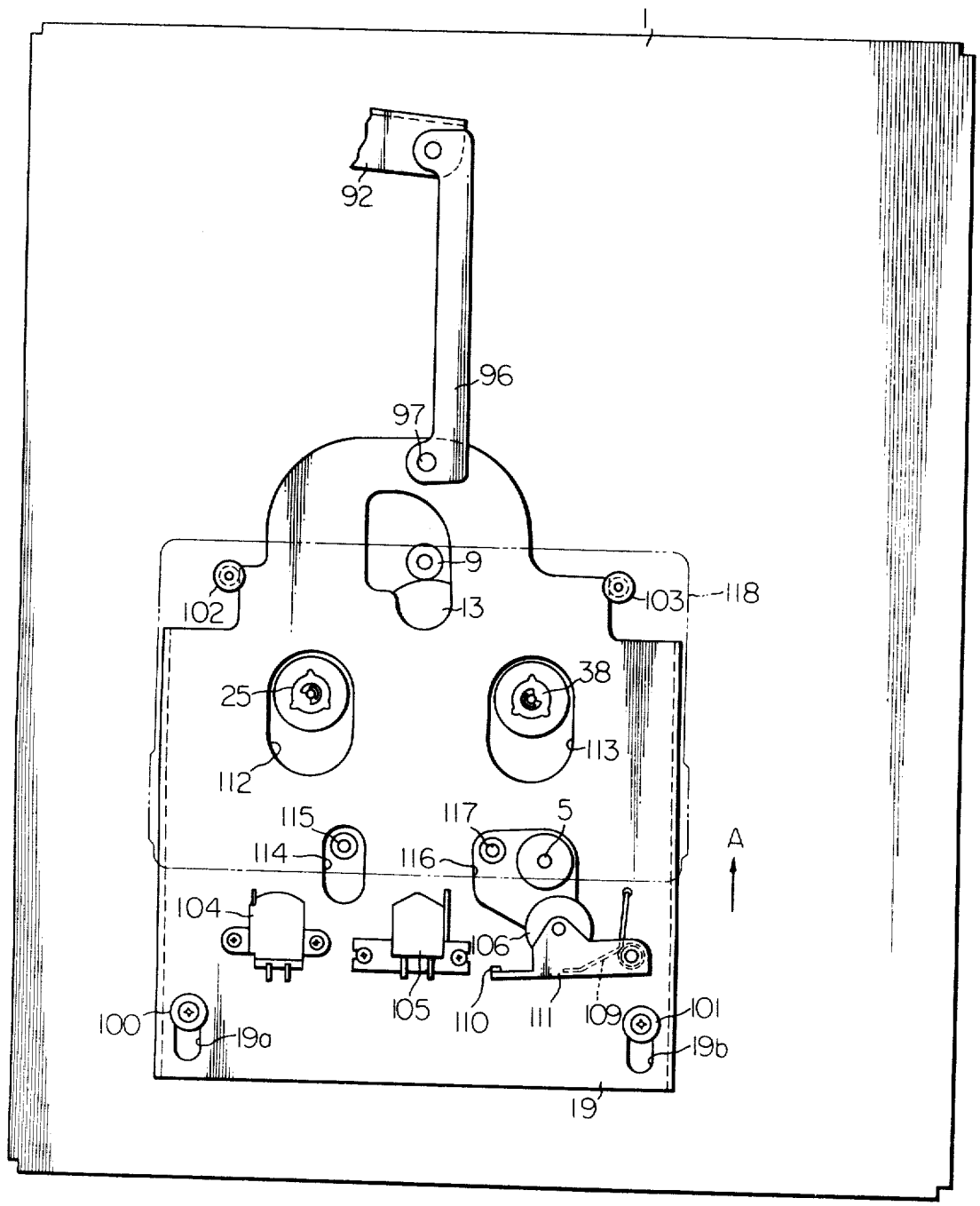

TWO-MOTOR CASSETT TYPE TAPE RECORDER

The present invention relates generally to tape recorders, and in particular to a cassette type tape recorder wherein two motors are employed for independently driving a capstan and a reel drive mechanism to assure constant tape transport speed.

In a certain prior art cassette type tape recorder, a capstan and a reel drive mechanism are driven by a single motor. Although this aids in the reduction of cost, the mechanism would be complicated and the tape transport speed is adversely affected by the mechanical load of the reel drive mechanism. Therefore, it is usually difficult to assure constant tape transport speed using a single motor drive mechanism. In another prior art tape recorder, a three-motor tape drive mechanism is employed, one for driving the capstan, the others for driving a supply reel and a take-up reel. This arrangement would add to the overall size and cost.

Accordingly, an object of the present invention is to provide an improved cassette type tape recorder which assures constant tape transport speed.

Another object of the present invention is to provide an improved cassette type tape recorder wherein the overall size of the mechanism is minimized using a single idler mechanism.

A further object of the present invention resides in the provision of a tape counter which can be positioned at any desired angle to provide a wide range of visibility.

A still further object of the present invention is to detect the type of cassettes employed and thereby to actuate associated circuit having different frequency response.

A still further object of the present invention is to prevent erroneous ejection of a cassette from the tape recorder when the tape is in play condition.

A still further object of the invention resides in the provision of means for detecting when the cassette is properly inserted into the tape recorder to actuate an associated circuit, thus preventing unnecessary operation of the recorder mechanism while no tape is in the recorder.

Briefly described, the present invention is characterized by the provision of two motors, a first motor for driving a capstan and a second motor for driving reels of the tape cassette. The reel drive mechanism comprises a supply wheel assembly and a take-up and fast-forward wheel assembly. A single idler is employed for selectively driving these assemblies by engagement with the second motor. The take-up and fast-forward wheel assembly includes two clutch action drive wheels provided at different positions of the vertical shaft of the assembly. These two wheels can be selectively driven by the idler by the movement of a platform member which carries thereon magnetic heads and a pinch roller for engagement with the cassette tape, the platform movement causing a cam portion thereof to correspondingly alter the idler's position relative to the chassis so as to engage either one of the two wheels. This arrangement serves to simplify the driving mechanism and thus minimize the overall size and cost.

These and other objects and features of the present invention will become apparent from the following description when taken in conjunction with the accompanying drawings, in which:

FIG. 1c is a sectional view of the tape recorder taken along lines 1c—1c in FIG. 1a, showing details of the supply wheel assembly;

FIG. 2a is a fragmentary sectional view showing an idler as seen along lines 2—2 in FIG. 1a, with the idler maintained at a higher position being disengaged from a platform cam member;

FIG. 2b is a fragmentary side view of the idler as seen along the same lines with the idler maintained at a lower position being engaged with the platform cam member;

FIGS. 3a to 3c are fragmentary side views of a cassette loader as seen along lines 3—3 in FIG. 1a;

FIG. 4a is a plan view of the platform member slidably arranged on the chassis of the tape recorder.

Figure 1A:
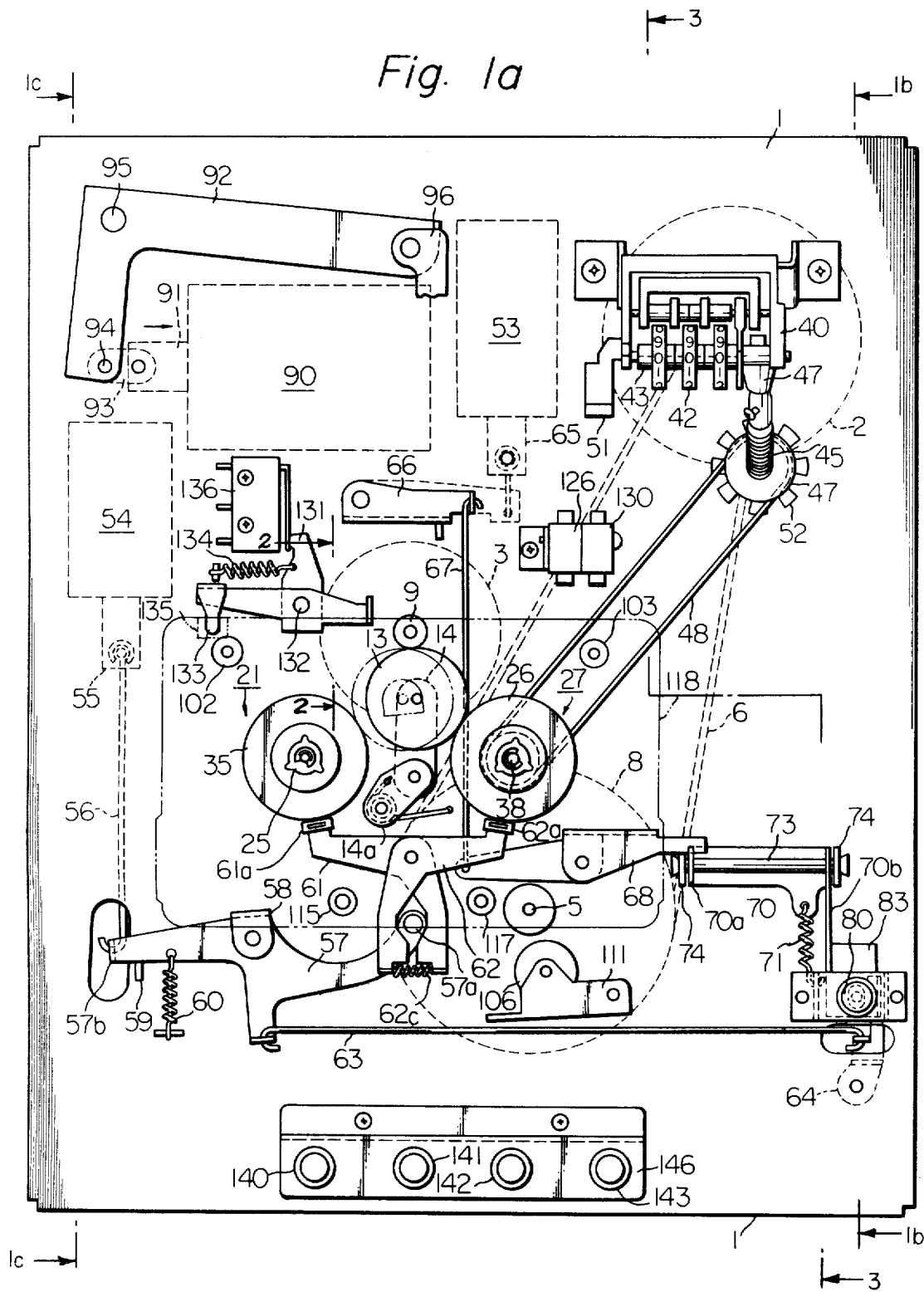
FIG. 1a is a plan view of a cassette type tape recorder in accordance with the present invention, with a platform member and a cassette loader (FIGS. 4a, 4b) removed for clarity.
Figure 1B:
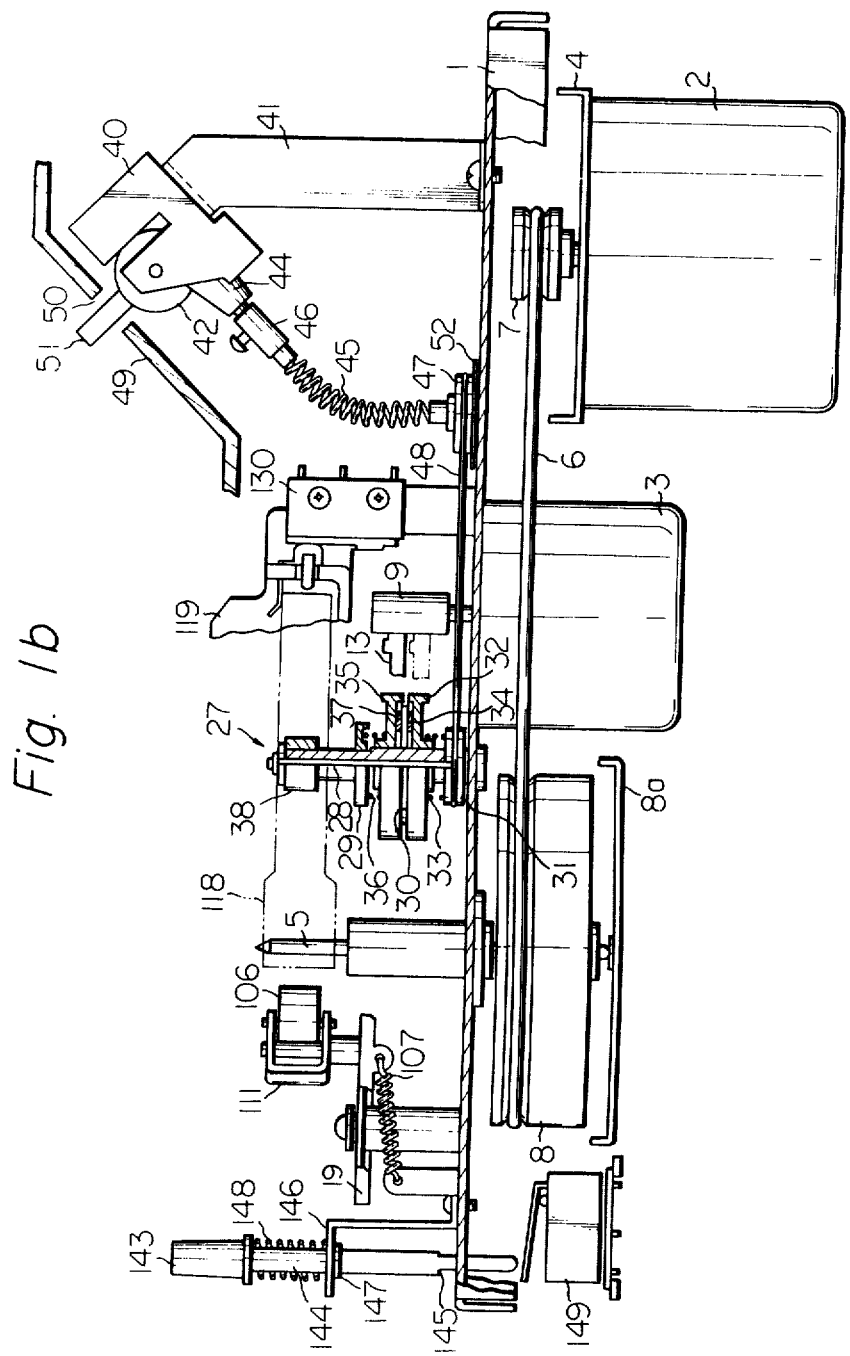
FIG. 1b is a sectional view of the tape recorder taken along lines 1b—1b in FIG. 1a, showing details of the take-up and fast-forward wheel assembly.

Referring now to the drawings, wherein like reference numerals indicate like parts throughout the several views, the mechanism of a two-motor cassette type tape recorder is shown in FIGS. 1a through 1c and generally includes a chassis 1, a capstan-drive motor 2 suitably secured to the lower side of the chassis by a bracket 4 at a suitable distance from a capstan 5 for driving it at a constant speed by means of a belt 6 and a reel-drive motor 3 of the reversible type. The speed of rotation of the motor 2 is reduced at a suitable diameter ratio between the motor pulley 7 and the flywheel 8 secured to the capstan 5 and rotatably supported on the thrust collar bearing 8a. The reel drive motor 3 is also secured to the lower side of the chassis and has a drive shaft 9 extending out of the chassis to the opposite side thereof. An idler assembly 10 shown in FIG. 2a is secured to the upper side of the chassis adjacent the drive shaft 9 and comprises a vertical shaft 11 slidably received in a bushing 12 and an idler member 13 with a resilient annular periphery around its edge and rotatably supported on a rod 14 fixedly supported on the shaft 11. The idler assembly 10 includes a clutch portion that includes a clutch felt member 15 suitably bonded to a disc 16 carried on one end of the horizontal rod 14 and downwardly urged by a leafspring 17. The rod 14 is in turn rotatably connected to a rod 14a by means of a pivot 14b. The rod 14a is secured to the shaft 11 and urged upwardly by a spring 20. The spring 20 also biases the idler 13 into engagement with the drive shaft 9. By the upward pressure of the spring 20, the shaft 11 is caused to abut the cam portion 18 of a platform 19 which is slidably carried on the chassis 1. Thus, the idler member 13 is normally maintained at a higher position, and when the platform slides past the shaft 11 the idler moves to a lower position by means of the cam 18.

In FIG. 1c, reference numeral 21 is a supply wheel assembly and includes a rotary shaft 22 rotatably carried on the chassis, a plurality of parallel wheels 23 and 24 disposed intermediate of the shaft 22 and a driving toothed section 25. A supply (rewind) wheel 26 having a downwardly flared portion for defining a chamber to receive therein the wheel 23 is rotatably coaxially disposed between the wheels 23 and 24 with a clutch felt 26a being interposed between the wheels 23 and 26. A clutch action is effected by a spring 28 interposed between the wheels 24 and 26. In FIG. 1b, numeral 27 is a take-up and fast-forward wheel assembly which comprises a rotary shaft 28 rotatably carried on the chassis, a pair of spaced apart wheels 29 and 30 secured to the shaft 28, a pulley 31 at the lower end portion thereof, and a driving toothed section 38. A take-up wheel 32 having an oppositely flared portion at the periphery thereof is rotatably disposed between the wheel 30 and the pulley 31 and urged toward the wheel 30 by a coil spring 33. A clutch felt 34 is disposed between the wheel 30 and the take-up wheel 32 to provide a clutch action. Similarly, a fast-forward wheel 35 having an oppsitely flared portion is rotatably disposed between the wheels 29 and 30 and urged toward the wheel 30 by a spring 36. A clutch felt 37 is interposed between the fast-forward wheel 35 and the wheel 29. It is to be noted that the take-up and fast-forward wheels are spaced apart from each other at predetermined levels from the chassis so that each corresponds to the varying height of the idler 13. As may be noted in FIG. 1a, clockwise rotation of the reel drive motor 3 results in the idler 13 moving toward the fast-forward wheel 35 to drive it in a clockwise direction. Counterclockwise rotation of the motor 3 will shift the idler toward the rewinding supply drive wheel 26 causing it to rotate counterclockwise. The clutch actions of the fast-forward and take-up wheels are such that the latter has a less frictional force than the former so that the tape reels in a cassette are driven at a greater rotational force and at a higher speed by the fast-forward wheel than they would be driven by the take-up wheel.

Reference numeral 40 in FIG. 1a, 1b denotes a tape counter supported on a bracket 41 at a suitable angle relative to the plane of the chassis to provide a wider angle of visibility to the operator. The counter 40 includes a set of the conventional numeral discs 42 for indicating the length of driven tape by the numbers of the hundredth, tenth and unit. These discs are coaxially arranged on a rotary shaft 43 and driven by means of a worm gear arrangement 44 which is in turn connected with one end of a flexible joint 45 by a screw 46. The flexible joint 45 has at the other end a pulley 47 which is rotatably secured to the chassis. A belt 48 is supported between the pulleys 31 and 47 to transmit the rotation of the rotary shaft 28 of the take-up and fast-forward assembly 27 to the flexible joint 45, and thence to the counter 40. The counter 40 is disposed under a panel 49 partly shown as covering the counter and provided with a window 50 through which the counter numerals are made visible from outside. The counter 40 is further provided with a zero-return lever 51 to reset the counter to zero. Numeral 52 indicates a rest-condition sensing gear wheel to enable a photosensor, such as a pilot lamp and a photo-transistor arrangement (not shown), to detect the rest condition of the cassette tape and energize a solenoid 53 which will be described hereinbelow. It will be understood that the use of a flexible joint mechanism for driving the counter allows it to be positioned at any suitable angle with respect to the chassis to provide a wider angle of visibility.

The chassis 1 carries thereon a plunger solenoid 54, at the left side thereof, which has its plunger 55 operatively connected to a rod 56 which has its looped end operatively connected to one arm of a connect lever 57. The connect lever 57 is a generally "T" shaped member and pivotally supported on a bracket 58 and urged toward a detent 59 by means of a spring 60 and has a pin 57a at its arcuate arm interposed between a pair of generally "L" shaped pivoted members 61. The intermediate arm of the connect lever 57 is operatively connected via a rod 63 to a lock lever 64 which will be described hereinbelow. The L shaped members 61 and 62, each having at one end thereof a brake shoe 61a, 62a, are arranged in opposed relationship and biased toward each other by means of a spring 62c at the other ends thereof so that the brake shoes engage the peripheral surfaces of the supply wheel 26 and the take-up and fast-forwardly wheels to exert respective braking forces thereto.

When the solenoid 54 is energized, it pulls up the plunger 52 thereby causing the connect lever 57 to rotate clockwise withstanding the biasing force applied by the spring 60. This causes the L shaped members to move away from each other by the pin 57a so that the brake shoes are disengaged from the respective wheels, removing the respective braking forces therefrom.

On the other hand, the solenoid 53 has its plunger 65 connected operatively to a generally U shaped lever 66 pivoted at its vertical axis on the chassis, and through a connecting rod 67 to one end of an unlocking lever 68 that is pivoted at an intermediate part thereof on the chassis. Numeral 70 is an eject lever used for ejecting a cassette from a cassette loader when a play is over; the details thereof being shown in FIGS. 3a and 3b. The eject lever 70 has at its one end a upright lever arm 70a and at the other end a horizontal lever arm 70b and is pivoted along the horizontal axis 73 rotatably supported on a pair of brackets 74. A lower extension of the upright arm is biased toward the lock lever 64 by a spring 71 to bias the upright arm toward lever 68 and an adjacent cassette portion. The upright lever 70a has stepped recess portions 70c and 70d. The unlocking lever 68 can engage recess portion 70d, as shown in FIG. 3a. Numeral 80 is an eject key which comprises a shaft 81 having a shoulder portion 82. The lower end portion of the shaft 81 extends through an aperture (not shown) of a flanged portion 83 of the arm 70b of the eject lever 70 and into the chassis and is upwardly urged by means of a spring 84 interposed between the lower edge of the key and the upper edge of a bracket 85. Thus, the key 80 is permitted of a vertically reciprocable movement by manually applied pressure. The shoulder portion 82 engages the flanged portion 83 to provide a counterclockwise rotation (FIGS. 3a, 3b) to the eject lever 70.

The lock lever 64 is pivotally supported at the lower side of the chassis and operatively connected to the connecting rod 63 so that the clockwise rotation of the connect lever 57 causes the free end of the lock lever 64 to move to a position coinciding with the lower end of the shaft 81 so that the downward movement of the shaft is prevented when the solenoid is energized.

Figure 4B:
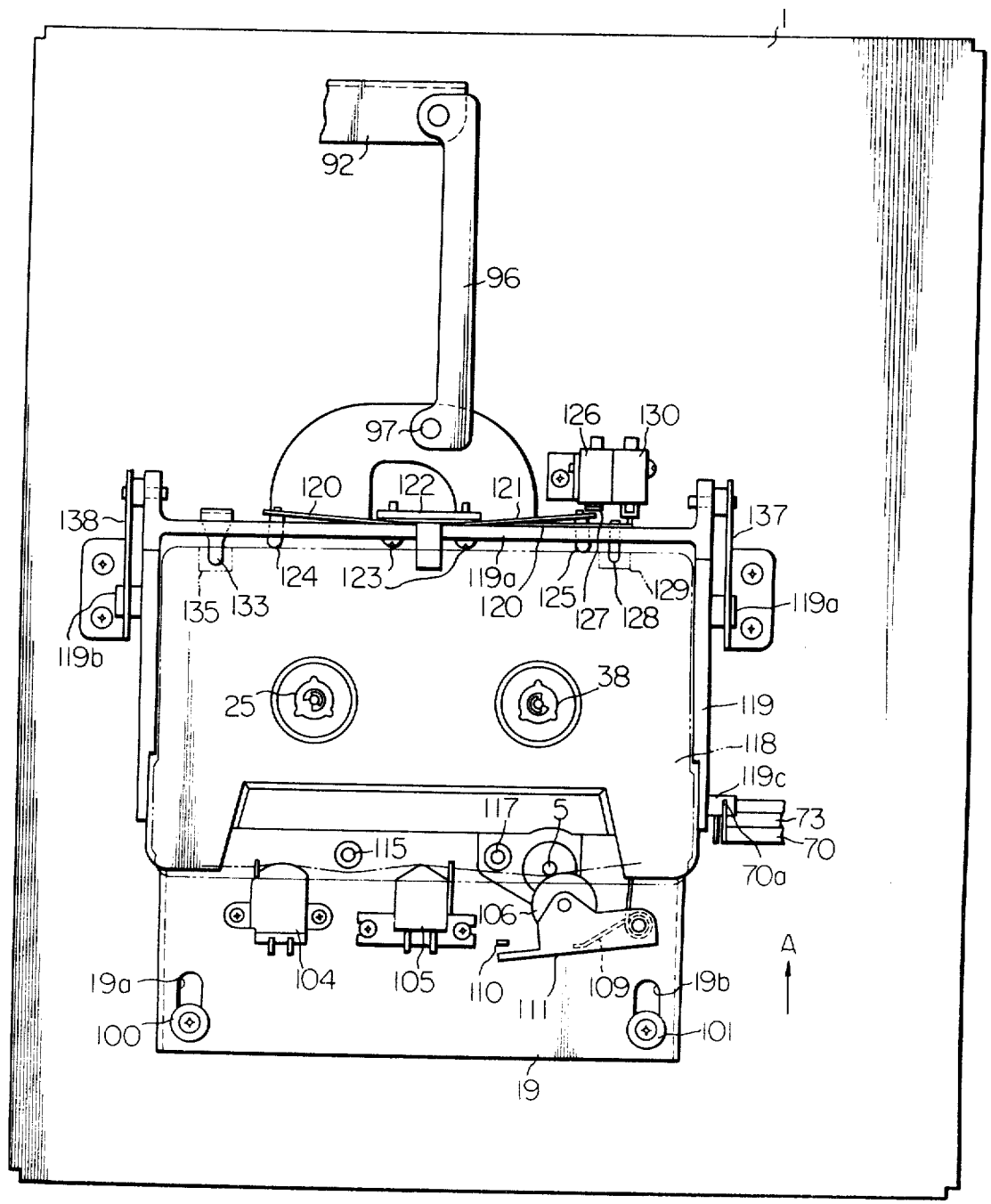
FIG. 4b is a plan view of the cassette loader with associated mechanical elements.

Reference numeral 90 is a solenoid mounted on the lower side of the chassis and which has its plunger 91 operatively connected to an L shaped connecting lever 92 via a connecting member 93 on which is pivoted a shaft 94 extending through an oversized aperture of the chassis (not shown). The lever 92 and has its free end pivotally connected to one end of a connecting rod 96. The rod 96 is operatively connected at the other end to a slidable loading and operating platform 19 (FIGS. 4a, 4b) by a connecting pin 97. The platform 19 has elongate apertures 19a and 19b at two corners thereof. Studs 100 and 101 extend through the apertures out of the chassis to permit the platform to slide along the apertures. Another pair of studs 102 and 103 are provided at the opposite corners to guide the platform along its sides. The platform 19 carries thereon an erase head 104, a record/playback head 105 and a pinch roller 106. The platform is biased by means of springs 107 and 108 (FIGS. 1b and 1c) into engagement with an end wall of the apertures 19a and 19b to free the pinch roller 106 from the capstan 5 as shown in FIG. 4a. The pinch roller 106 is rotatably mounted on a suitable bracket 111 and urged toward the capstan 5 by a spring 109. In the usual manner, it is also urged into engagement with a stop member 110. The platform 19 is further provided with a plurality of apertures 112 and 113 through which the toothed section 25 of the supply wheel assembly and the toothed section 21 of the take-up and fast-forward wheel assembly extend outwardly. The platform 19 is further provided with apertures 114 and 116 through which guide pins 115 and 117 extend for guiding a tape cassette 118 into the cassette loader 119 (FIGS. 4a, 4b).

The cassette loader 119 (FIG. 4b) is a U shaped member enabling insertion of the cassette into play position and removal therefrom between the arms of the U. The U shaped member has on its rear end wall 119a leafsprings 120 and 121 firmly secured thereto by a plate member 122 and set screws 123. Projections 124 and 125 are affixed to one end of each of the leafsprings 120 and 121. When the cassette 118 is placed in position with the guide pins 115 and 117 being received into the corresponding holes of the cassette, the projections 124 and 125 are moved away from the rear wall 119a and spring 121, displaced by projection 125, closes a switch 126. The closure of the switch 126 actuates the associated circuitry (not shown) to put the recorder into play condition. It will be understood that the leafspring 121 serves the functions of firmly engaging the cassette into the cassette loader and detecting when the cassette has been inserted into the tape recorder to actuate the associated circuit, thus avoiding unnecessary energization of the tape recorder upon incidental actuation of the actuating keys when the recorder is not loaded with a cassette. The leafspring 120 is further provided at the other end with a projection 128 which, when the cassette used is a chromium-dioxide tape cassette, is received in the corresponding opening 129 of the cassette, and a normally closed switch 130 remains closed to energize an amplifier circuit having a particular frequency response. If the cassette is a standard type cassette, the switch 130 is opened to energize another amplifier having a particular frequency response.

Turning to FIG. 1a, the chassis 1 carries thereon a generally T shaped member 131 pivotally supported on a pin 132 and having a projection 133. A spring 134 biases the T shaped member 131 in a counterclockwise direction. As is usually known in the art, the cassette is provided with an opening 135 at the rear end wall thereof for receiving the projection 133 to actuate a switch 136 to prevent recording. When the usual lip is provided over the opening 135, the switch 136 is opened to permit recording.

In FIGS. 3a 3c and 4b, the cassette loader 119 is provided with projections 119a, 119b and 119c at the side walls thereof and is pivotally supported on a pair of brackets 137 and 138 having horizontal arms 137a and 138a, respectively.

Springs 139 and 140 bias the loader to an upward position where the projections 119a and 119b abut the arms 137a and 138a. Under normal play condition, the cassette loader 119 is held in a horizontal position (FIG. 3a) with the projection 119c being engaged within the recess 70c of the arm 70a of the eject lever 70.

Numerals 140 to 143 in FIG. 1a denote actuating keys used for manually actuating the tape recorder in various modes of operation; 140 being used for rewind mode; 141 for stopping the operation; 142 for record/playback mode; and 143 for fast-forward mode. These keys are provided on the chassis in a manner similar to that described in connection with the eject key 80. In FIG. 1b, only one of the keys is shown and comprises a shaft 144 having a shoulder portion 145 slidably supported on a bracket 146 and extending into the opposite side of the chassis. A stop member 147 is provided intermediate of the shaft to prevent it from being pulled up from the bracket. A spring 148 is provided to permit vertical reciprocal movement for actuating a switch 149 which energizes related circuitry (not shown).

In operation, the eject key 80 is momentarily actuated, resulting in the disengagement of the projection 119c of the cassette loader 119 from the arm 70a of the eject lever 70. The cassette loader springs off to a tilted position by the spring 139. A standard tape cassette is inserted into the loader, which is pressed downwardly into engagement with the lock arm 70a. The pin 133 is pushed way from its normal position by the lip which is usually provided for the standard tape cassette. This results in the operation of the switch 136 to close a circuit in preparation of record/playback mode of operation.

RECORD/PLAYBACK MODE

Upon actuation of the record/playback key 142, the capstan drive motor 2, the reel drive motor 3, and the solenoids 54 and 90 are energized. The capstan 5 is driven by the belt 6 at a constant tape transport speed. The operation of the solenoid 54 causes the connect lever 57 to turn clockwise, resulting in the oppositely disposed L shaped members 61 moving away from each other to disengage the brake shoes 61a and 62a from the peripheral surfaces of the respective wheels 35 and 26. Simultaneously, the lock lever 64 is pulled by the connecting rod 63 to a position directly under the eject key 80 to bring it into a locked condition. This ensures against erroneous ejection of the cassette from the cassette loader during tape play. The operation of the solenoid 90 causes counterclockwise rotation of the L shaped lever 92, resulting in the slidable movement of the platform 19 in a direction shown by arrow A in FIG. 4b. The movement of the platform brings the cassette tape into tape transport engagement between the capstan 5 and the pinch roller 106, and into tape slip engagement with the magnetic heads 104 and 105. The tape is thus driven at a constant normal play speed rightwardly. The movement of the platform also causes the cam portion 18 to push the shaft 11 downwardly (FIG. 2a) and thereby shifts the idler 13 to a lower position clockwise rotation of reel drive shaft 9 then holds the idler at left, engaged with forward driving take-up wheel 32 as indicated in dashedline in FIG. 1a. Counterclockwise rotation of the motor 3 causes the idler 13 to shift toward the right into engagement with the rewinding supply wheel 26 to drive it counterclockwise.

When the stop switch 141 is operated, the motors 2 and 3, and the solenoids 54 and 90 are deenergized and the braking forces of pads 61a and 62a are again applied to the wheel assemblies 21 and 27. With the cassette tape being at rest, the eject key can be actuated. Upon actuation of the eject key, the cassette loader 119 is released from engagement and springs off to a tilted position as previously described for easy access to the cassette for removal. The tape cassette is ejected from the cassette loader by means of the leafsprings 120 and 121. The pin 125 (FIG. 4b) is restored to normal position and opens the switch 126 to deenergize the associated circuits.

FAST-FORWARD MODE

Upon actuation of the fast-forward switch 143, the motors 2 and 3 and the solenoid 54 are energized. Since the solenoid 90 is not energized, the magnetic heads 104, 105 and the pinch roller 106 are held away from the cassette tape, and the idler is held at a higher position corresponding to that of the fast-forward wheel 35 (FIGS. 1b and 2a). The operation of the solenoid 54 releases the braking forces applied to the wheel assemblies 21 and 27 and causes the eject key into a locked condition. Counterclockwise rotation of the reel drive motor 3 causes the idler 13 into engagement with the fast-forward wheel 35 to drive it at a speed higher than the normal tape play speed. It will be apparent from the foregoing that a change of modes from the record/playback mode to the fast-forward mode is effected by the mere expedient of deenergizing the solenoid 90.

REWIND MODE

When the rewind switch 140 is actuated, the motor 3 and the solenoid 54 are energized. Since the motor 2 and the solenoid 90 remain deenergized, the capstan 5 is at rest and the platform 18 is at normal retracted position as shown in FIG. 4a, with the idler 13 being at a higher position. The operation of the solenoid 54, as previously described, releases the braking forces applied to the wheel assemblies 21 and 27 and causes the eject key 80 into a locked condition. The motor 3 rotates, in this mode, in a clockwise direction to cause the idler 13 into engagement with the supply or rewind wheel 35 and drives it in a direction opposite to the normal tape play direction and at a speed higher than the normal tape play speed.

If the cassette tape has been completely wound up to either terminated end thereof during any of these operational modes, a frictional slip would develop in the clutch portion of either of the wheel assemblies 21 and 27, and cause the tape to come to halt, while the driving wheel continues to run. The rest-condition sensing gear wheel 52 also comes to a halt, which is detected by the photosensor (not shown) and energizes the circuit associated with the stop switch 141 to restore the recorder to normal condition and to energize the solenoid 53 to cause a clockwise rotation of the lever 68 to disengage the arm 70a from the projection 119c of the cassette loader 119. The cassette loader is thus automatically released from the locked condition to permit easy access to the tape cassette for removal.

What is claimed is:

1. A tape recording-reproducing apparatus, comprising:
  a chassis receptive of a cassette having a tape for recording signals thereon and reproducing the signals;
  a capstan rotatably mounted on said chassis; a motor on said chassis for driving said capstan at a constant peripheral speed for the recording and reproducing of signals;
  a pinch roller movable between an active position in which the roller is in frictional engagement with the tape on the periphery of the capstan and an inactive position wherein the roller is withdrawn from the tape;
  first clutch wheel means for driving a first tape wheel of the cassette to rewind the tape;
  second and third clutch wheel means coaxially arranged for driving an second tape reel in the cassette to wind the tape in forward direction at different speeds;
  an idler wheel mounted on said chassis and movable between a first active position in which said idler wheel is in frictional engagement with the periphery of said first clutch wheel means, a second active position in which said idler wheel is in frictional engagement with the periphery of said second clutch wheel means, and a third active position in which said idler wheel is in frictional engagement with periphery of said third clutch wheel means;
  reversable motor means having a driving shaft in frictional driving engagement with the periphery of said idler wheel for moving that wheel in said first active position and, at different speeds, in said second and third active positions;
  means for axially moving said idler wheel between said second and third active position; and
  transducing means for the recording and reproducing of signals on the tape; whereby said reversable motor means and said motor for driving said capstan are enabled to drive the apparatus for rewinding the tape by said first tape reel and for playing and fast forward moving of the tape by said second tape reel.

2. Apparatus according to claim 1 including linkage supporting said idler wheel and comprising first and second arms, said idler wheel being rotatably mounted on the first arm, said arm being pivotally connected to the second arm and that arm being pivoted on said chassis; said second arm being biased to urge said idler wheel toward said driving shaft of said reversable motor.

3. Apparatus according to claim 1 additionally including a pair of generally L-shaped pivoted members opposedly biased toward each other, each L-shaped member having two arms one of which is selectively engageable in frictional contact with the peripheries of said first, second and third clutch wheels, and a pin disposed between and engageable with end portions of the other arms and to disengage said one arm of each L-shaped member from said frictional contact.

4. Apparatus according to claim 1 additionally including a support member for supporting the cassette received in the chassis, said support member being movable between an active position in which said pinch roller is in frictional contact with the tape of the cassette, on the periphery of said capstan, and said transducing heads are in contact with one side of the tape, and a normally inactive position in which said pinch roller and transducing heads are disengaged from said contact thereof; and said means for axially moving said idler wheel comprising a cam, fixed on said movable support member and engageable with a shaft of said idler wheel for axially moving said shaft and wheel relative to said chassis; and means for moving said support member and cam so that said idler wheel is moved between said second and third active positions.

5. Apparatus according to claim 4 in which the first clutch wheel means has a first spindle coaxial and engagable with a tape reel in the cassette, in said active position, for rewinding the tape; and the second clutch wheel means comprises a second and a third clutch wheel coaxially mounted on said chassis and a second spindle coaxial with said second and third clutch wheels and engagable with another tape reel in the cassette in said active position thereof for forward winding of tape; the second clutch wheel means also comprising means for rapidly rotating said second spindle for fast forward winding and means for more slowly forwardly turning said second spindle for pick-up of the tape.

6. Apparatus according to claim 4 including linkage supporting said idler wheel and comprising first and second arms, said idler wheel being rotatably mounted on the first arm, said arm being pivotally connected to the second arm and that arm being pivoted on said chassis; said second arm being biased to urge said idler wheel toward said driving shaft of said reversable motor.

7. Apparatus according to claim 4 additionally including a pair of generally L-shaped pivoted members opposedly biased toward each other, each L-shaped member having two arms one of which is selectively engageable in frictional contact with the periphery of said first, second and third clutch wheels, and a pin disposed between and engageable with end portions of the other arms and to disengage said one arm of each L-shaped member from said frictional contact.

* * * * *